US011295237B2

United States Patent
Korada et al.

(10) Patent No.: US 11,295,237 B2
(45) Date of Patent: Apr. 5, 2022

(54) SMART COPY OPTIMIZATION IN CUSTOMER ACQUISITION AND CUSTOMER MANAGEMENT PLATFORMS

(71) Applicant: Zeta Global Corp., New York, NY (US)

(72) Inventors: Pavan Korada, San Mateo, CA (US); Sunpreet Singh Khanuja, Santa Clara, CA (US); Ao Li, New York, NY (US)

(73) Assignee: Zeta Global Corp., New York, NY (US)

(*) Notice: Subject to any disclaimer, the term of this patent is extended or adjusted under 35 U.S.C. 154(b) by 669 days.

(21) Appl. No.: 16/220,518

(22) Filed: Dec. 14, 2018

(65) Prior Publication Data

US 2020/0193322 A1   Jun. 18, 2020

(51) Int. Cl.

| | | |
|---|---|---|
| *G06N 20/00* | (2019.01) | |
| *G06F 16/958* | (2019.01) | |
| *G06F 16/957* | (2019.01) | |
| *G06K 9/62* | (2022.01) | |
| *G06N 3/06* | (2006.01) | |
| *G06N 3/04* | (2006.01) | |
| *G06N 7/00* | (2006.01) | |
| *G06N 5/02* | (2006.01) | |
| *G06N 5/00* | (2006.01) | |

(52) U.S. Cl.
CPC ........ *G06N 20/00* (2019.01); *G06F 16/958* (2019.01); *G06F 16/9577* (2019.01); *G06K 9/6201* (2013.01); *G06N 3/0454* (2013.01); *G06N 3/06* (2013.01); *G06N 5/025* (2013.01); *G06N 7/005* (2013.01); *G06N 5/003* (2013.01)

(58) Field of Classification Search
None
See application file for complete search history.

(56) References Cited

U.S. PATENT DOCUMENTS

| | | | |
|---|---|---|---|
| 6,029,139 A | 2/2000 | Cunningham et al. | |
| 10,091,140 B2 * | 10/2018 | Galley | G06F 40/56 |
| 2011/0313865 A1 | 12/2011 | Sinyagin et al. | |
| 2012/0215640 A1 * | 8/2012 | Ramer | G06Q 30/0269 |
| | | | 705/14.55 |
| 2017/0262878 A1 | 9/2017 | Cetintas et al. | |

(Continued)

FOREIGN PATENT DOCUMENTS

WO   WO-2020123949 A1   6/2020

OTHER PUBLICATIONS

"Natural Language Toolkit", https://www.nltk.org/, 2 pgs.

(Continued)

*Primary Examiner* — Alan Chen
(74) *Attorney, Agent, or Firm* — Schwegman Lundberg & Woessner, P.A.

(57) ABSTRACT

In some examples, special-purpose machines are provided that facilitate smart copy optimization in a network service or publication system, including software-configured computerized variants of such special-purpose machines and improvements to such variants, and to the technologies by which such special-purpose machines become improved compared to other special-purpose machines that facilitate adding the new features. Such technologies can include special artificial-intelligence (AI), machine-learning (ML), and natural-language-processing (NLP) techniques.

12 Claims, 9 Drawing Sheets

(56) References Cited

U.S. PATENT DOCUMENTS

| | | |
|---|---|---|
| 2018/0108066 A1 | 4/2018 | Kale et al. |
| 2020/0007934 A1* | 1/2020 | Ortiz .................... G06N 3/0454 |
| 2020/0021873 A1* | 1/2020 | Swaminathan .... G06Q 30/0276 |
| 2020/0034887 A1* | 1/2020 | Hamedi ............. G06Q 30/0204 |

OTHER PUBLICATIONS

"Stanford Log-linear Part-Of-Speech Tagger", https://nlp.stanford.edu/software/tagger.html, 8 pgs.

Toutanova, Kristina, et al., "Enriching the Knowledge Sources Used in a Maximum Entropy Part-of-Speech Tagger", Proceedings of the Joint SIGDAT Conference on Empirical Methods in Natural Language Processing and Very Large Corpora, (2000), 63-70.

Toutanova, Kristina, et al., "Feature-Rich Part-of-Speech Tagging with a Cyclic Dependency Network", Proceedings of HLT-NAACL, (2003), 252-259.

"International Application Serial No. PCT/US2019/066244, International Preliminary Report on Patentability dated Jun. 24, 2021", 9 pgs.

"International Application Serial No. PCT/US2019/066244, International Search Report dated May 4, 2020", 5 pgs.

"International Application Serial No. PCT/US2019/066244, Written Opinion dated May 4, 2020", 7 pgs.

\* cited by examiner

SMART COPY OPTIMIZATION IN CUSTOMER ACQUISITION AND CUSTOMER MANAGEMENT PLATFORMS

TECHNICAL FIELD

The subject matter disclosed herein generally relates to the technical field of special-purpose machines that facilitate smart copy optimization in a network service or publication system, including software-configured computerized variants of such special-purpose machines and improvements to such variants, and to the technologies by which such special-purpose machines become improved compared to other special-purpose machines that facilitate adding the new features. Such technologies can include special artificial-intelligence (AI), machine-learning (ML), and natural-language-processing (NLP) techniques.

BACKGROUND

Conventional technology lacks the ability to optimize copy (or content) as a communication medium in the context of Customer Acquisition and Customer Relationship Management (CRM) platforms. In extant tools and technology there is little focus on optimizing content using scientific methods. Barring some split testing techniques, subjective and anecdotal techniques continue to be used to optimize content. Also, besides generic guidelines, few insights are available to inform the construction of future copy. The present application seeks to provide scientific methods to address these problems.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
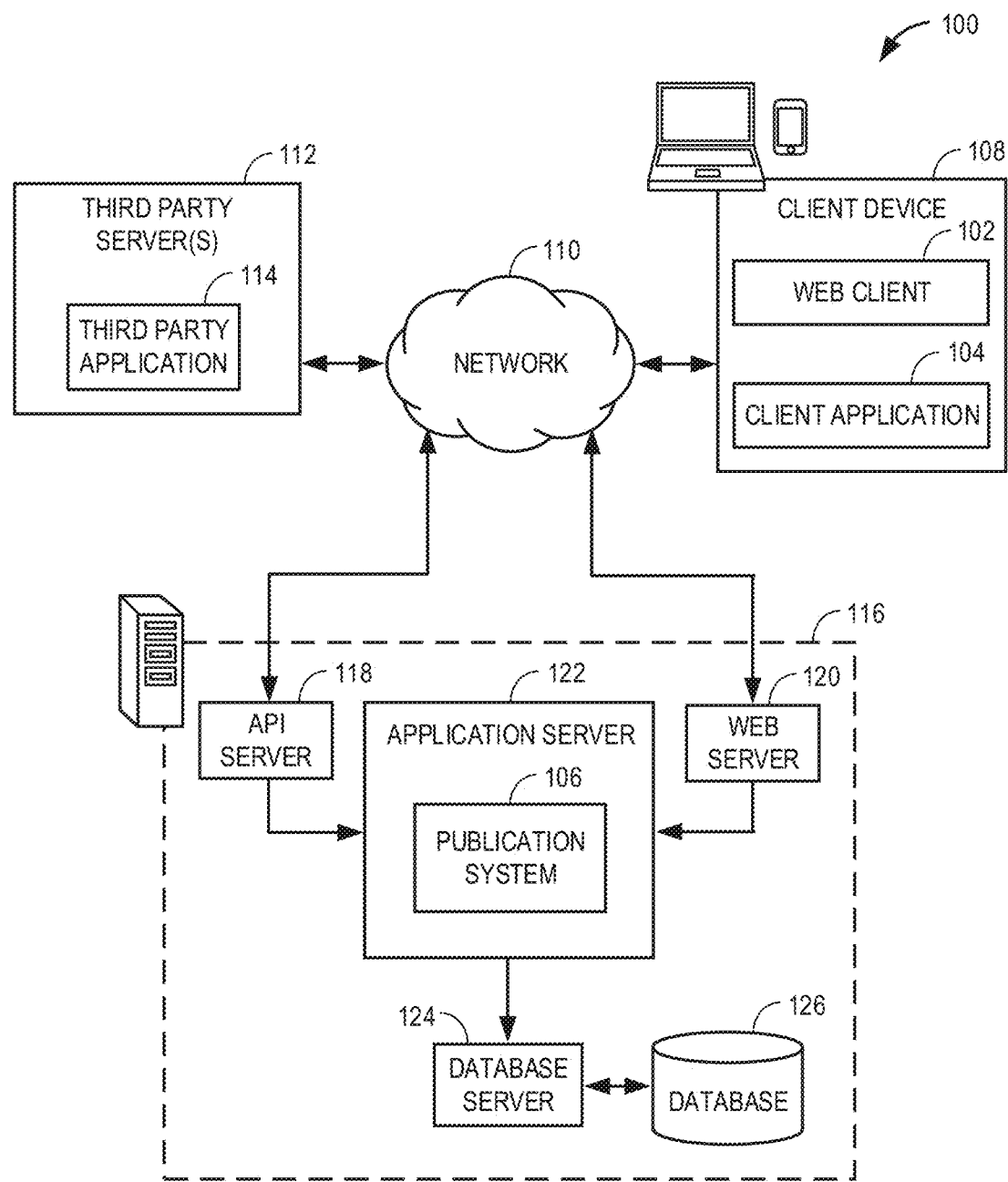
FIG. 1 is a block diagram illustrating aspects of a networked system, according to an example embodiment.

Example methods, systems, and computer programs are directed to smart copy optimization in a network service or publication system. Examples merely typify possible variations. Unless explicitly stated otherwise, components and functions are optional and may be combined or subdivided, and operations may vary in sequence or be combined or subdivided. In the following description, for purposes of explanation, numerous specific details of technologies are set forth to provide a thorough understanding of example embodiments. Such technologies can include special artificial-intelligence (AI), machine-learning (ML), and natural-language-processing (NLP) techniques. It will be evident to one skilled in the art, however, that the present subject matter may be practiced without these specific details.

One general aspect includes a copy optimization tool comprising a memory; a neural network including a plurality of input nodes, wherein each input node includes a memory location for storing an input value; a plurality of hidden nodes, wherein each hidden node is connected to each input node and includes computational instructions, implemented in machine code, for computing output numbers, respectively; and a plurality of output nodes, wherein each of the output nodes includes a memory location for storing a respective output signal indicative of a first value or feature; a driver recognizer that employs dynamic programming mechanisms to ascertain drivers based upon a series of observations from the neural network; and one or more computer processors, configured to execute instructions programmed using a set of machine code, wherein the instructions, when executed by the one or more computer processors, cause the one or more computer processors to perform operations comprising: extracting a text input from a message subject line; processing the text input at the neural network; by the driver recognizer, identifying one or more drivers in the text input; by the driver recognizer, generating a respective machine-readable driver score for each of the one or more drivers identified in the text input; and displaying a human-readable assessment or ranking of the one or more drivers in a graphical user interface.

Generally, advertisers working in real-world or online environments review three key optimization levers in their marketing campaigns, namely which entity to target, which marketing channel to use (for example, email, social media, etc.), and what message to send. All levers are important in driving marketing return on investment (ROI), but typically more attention is given to targeting and channel mix than to messaging copy and content. The present inventors have realized that marketing language (copy) can be improved in some examples using AI/NLP techniques with significantly improved results. Using a technically-improved copy optimization tool as described herein, mainstream and other advertisers can successfully optimize their marketing language (copy) and significantly improve ROI, while significantly reducing the burden of human input, oversight, and testing.

In some examples, a copy optimization tool of the present application can eliminate the need for testing copy (for example, email subject line language), can identify key driver words and phrases (also known as "drivers") to inform future copy build, and can leverage insights from many hundreds of advertisers. Optimized copy language can in some examples raise mail open rates by several percentage points, for example from 32% to 36%.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smartphone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data-transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware" component or tool is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component or tool mechanically, in dedicated and permanently configured circuitry, or in temporarily configured circuitry (e.g., configured by software) may be driven by cost and time considerations. Accordingly, the phrase "hardware component" (or "hardware-implemented component") or "hardware-implemented tool" should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled.

Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" or "processor-implemented tool" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"Native Application" or "native app" in this context refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings forming a part of this document: Copyright 2017-2018, Zeta Global Corp., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 that provides a number of functions and services to the client application 104 that accesses the networked system 116. The client application 104 also provides a number of interfaces described herein, which may present the output of certain operations to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., publication system 106) via the web interface supported by the web server 120. Similarly, the client application 104 accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the programmatic client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
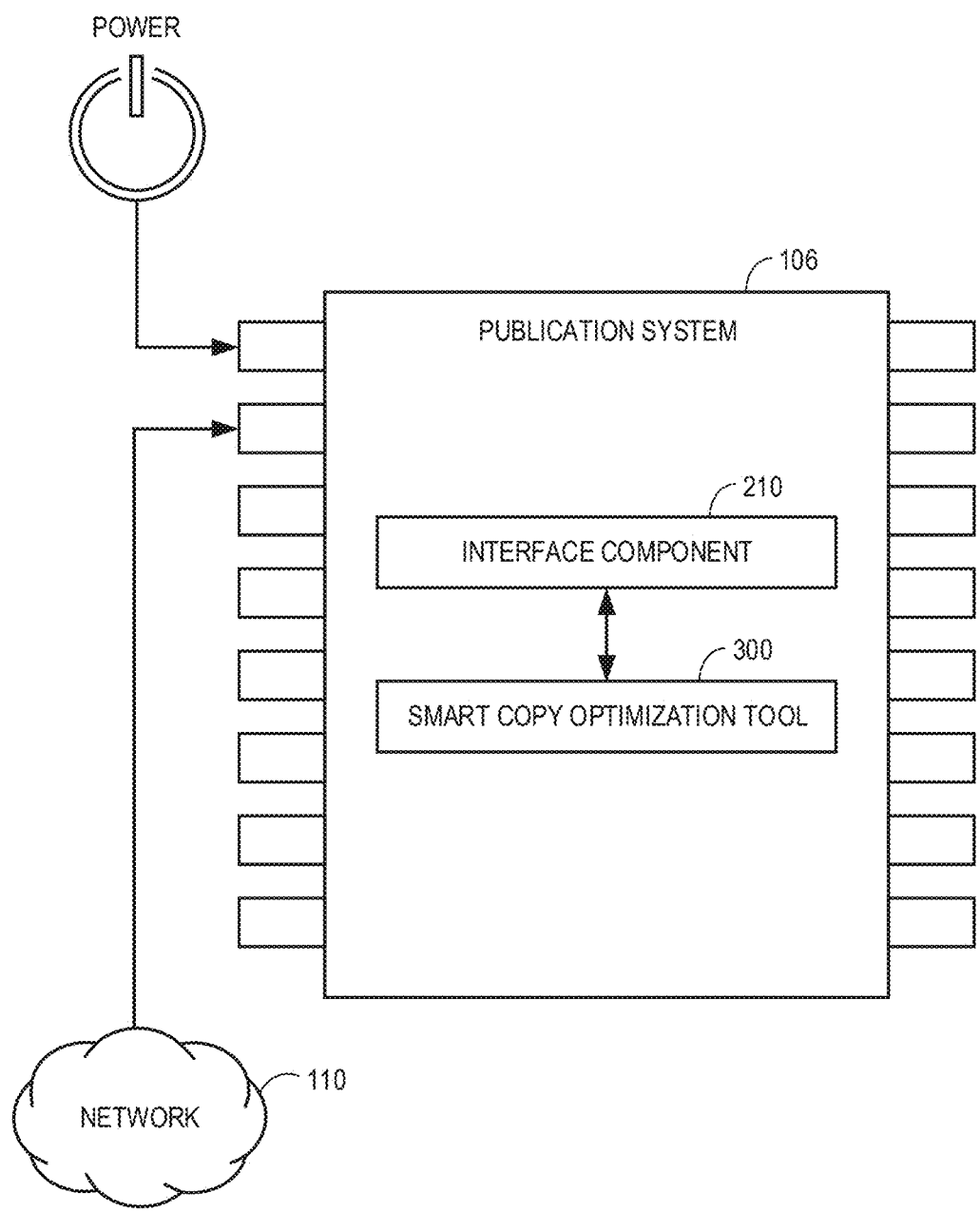
FIG. 2 is a block diagram showing architectural details of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a smart copy optimization tool 300 that operates to provide copy optimization techniques in accordance with the methods described herein with reference to the accompanying drawings.

Figure 3:
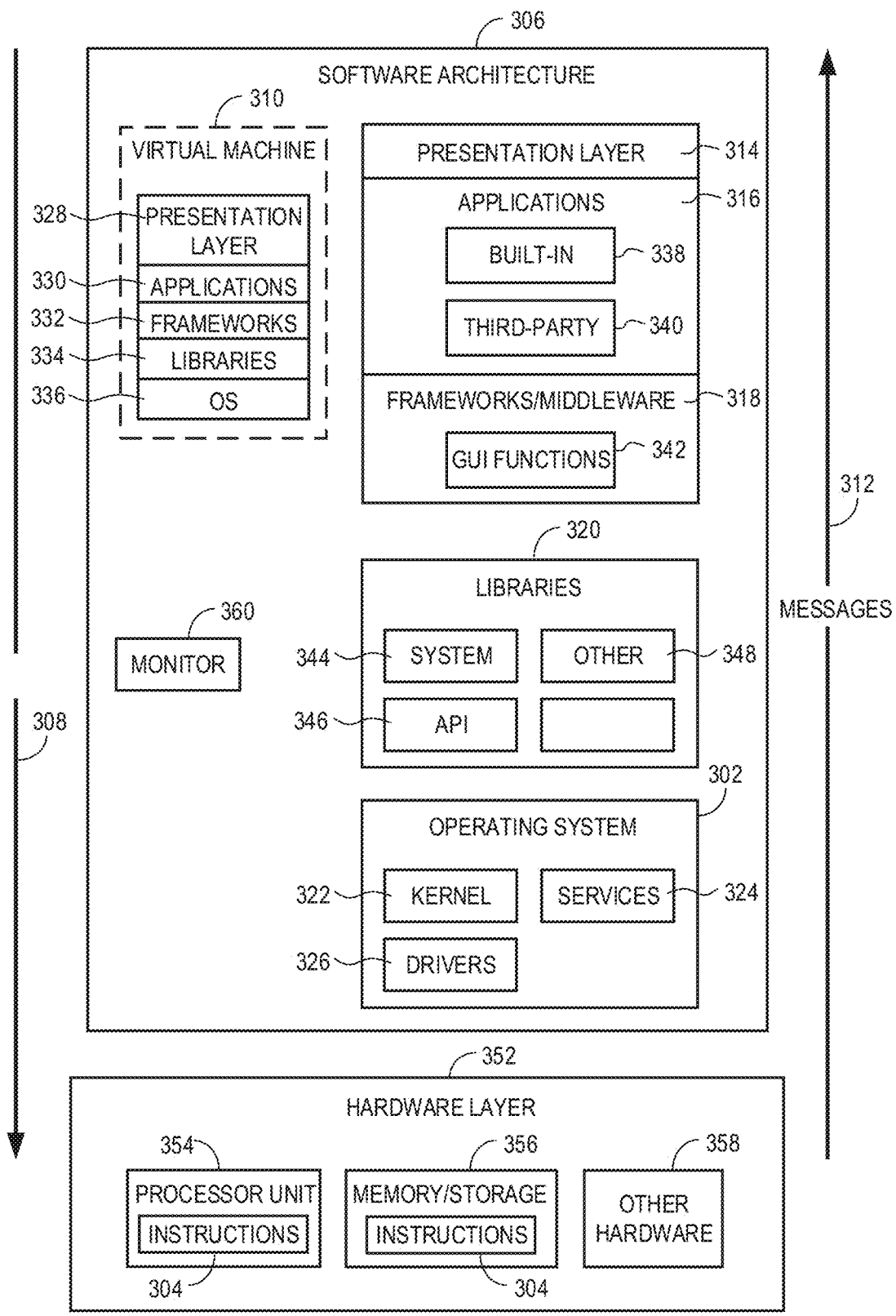
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
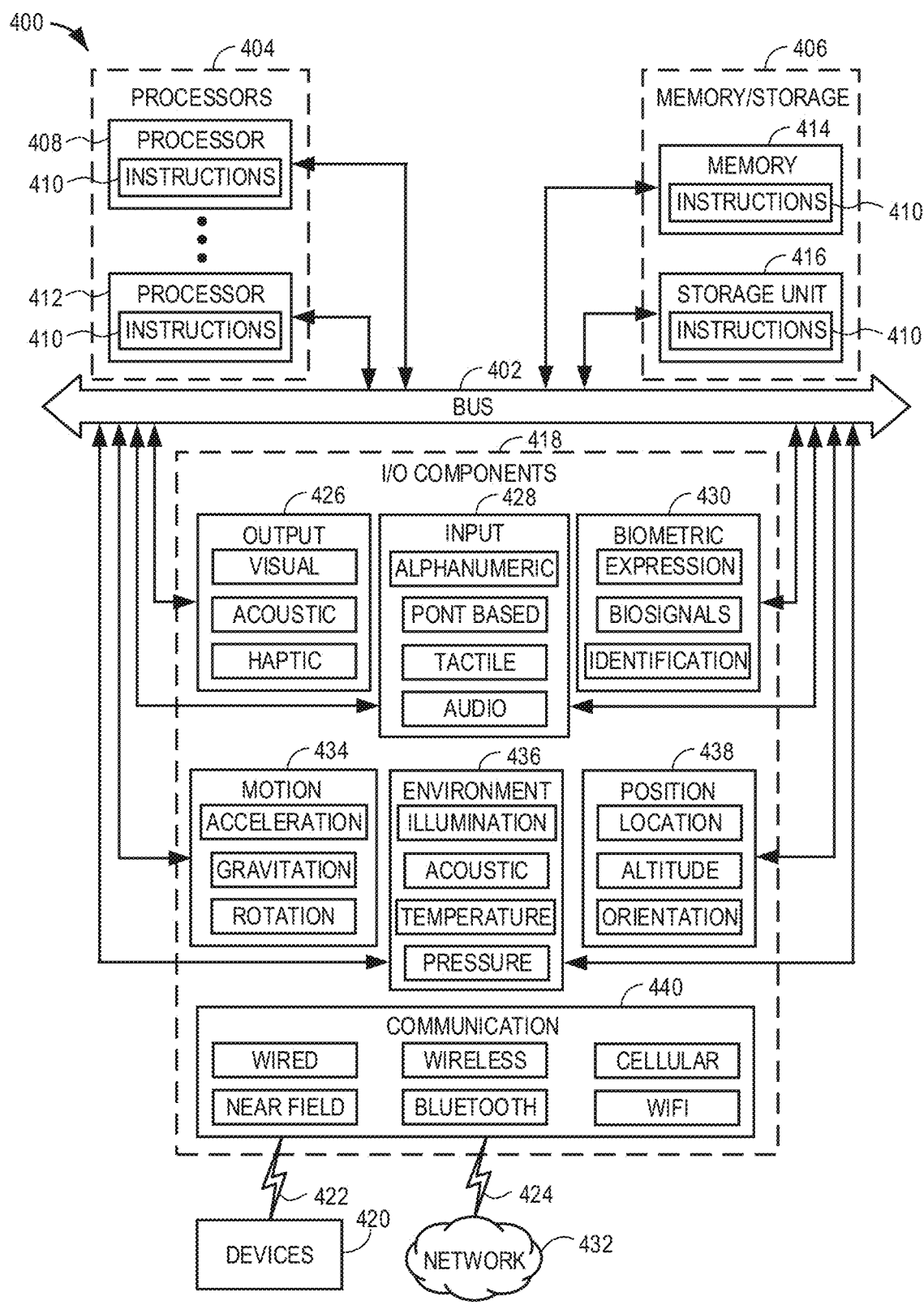
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RS S-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Figure 5:
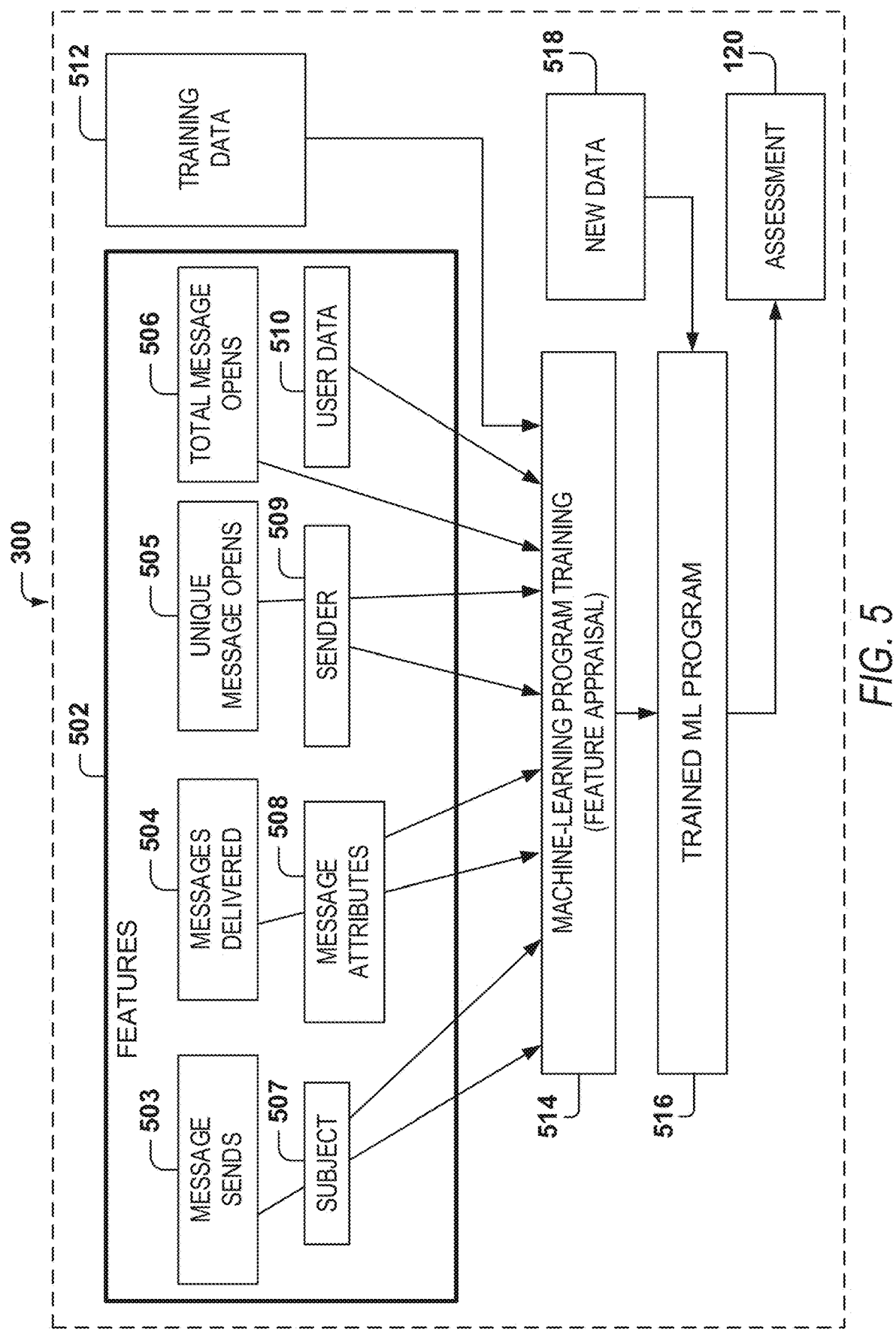
FIG. 5 illustrates the training and use of a machine-learning program, according to some example embodiments.

FIG. 5 illustrates the training and use of a machine-learning program, according to some example embodiments. In some example embodiments, machine-learning programs (MLPs), also referred to as "machine-learning algorithms" or "tools," are utilized to perform operations associated with copy optimization.

Machine learning is a field of study that gives computers the ability to learn without being explicitly programmed. Machine learning explores the study and construction of algorithms, also referred to herein as "tools," that may learn from existing data and make predictions about new data. Such machine-learning tools operate by building a model from example training data 512 in order to make data-driven predictions or decisions expressed as outputs or assessments 520. Although example embodiments are presented with respect to a few machine-learning tools, the principles presented herein may be applied to other machine-learning tools.

With reference to FIG. 5, in some example embodiments of the smart copy optimization tool 300, different machine-learning tools may be used. For example, Logistic Regression (LR), Naive-Bayes, Random Forest (RF), neural network (NN), matrix factorization, and Support Vector Machine (SVM) tools may be used for classifying or assessing copy language.

Two common types of problems in machine learning are classification problems and regression problems. Classification problems, also referred to as "categorization problems," aim at classifying items into one of several categories (for example, is this object an apple or an orange?). Regression algorithms aim at quantifying some items (for example, by providing a value that is a real number). In some embodiments, example machine-learning algorithms identify copy drivers and facilitate the optimization of copy language without testing. The machine-learning algorithms utilize the training data 512 to find correlations among identified features 502 that affect the outcome.

The machine-learning algorithms utilize the features 502 for analyzing the data to generate copy assessments 520 or identify copy drivers. A feature 502 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, performance data, and graphs.

In one example embodiment, the features 502 may be of different types and may include one or more of message sends 503, messages delivered 504, unique message opens 505, total message opens 506, subject of the message 507, other message attributes 508, sender 509, and other user data 510 (for example, unsubscribe requests).

The machine-learning algorithms utilize the training data 512 to find correlations among the identified features 502 that affect the outcome or assessment 520. In some example embodiments, the training data 512 includes labeled data or performance data, which is known data for one or more identified features 502 and one or more outcomes, such as detecting copy drivers (e.g., key words or phrases boosting open rates), detecting open rates, detecting communication patterns, detecting the meaning of the message, generating a summary of the message, detecting action items in the message, detecting urgency in the message, detecting a relationship of the user to the sender, calculating score attributes, calculating message scores, etc.

With the training data 512 and the identified features 502, the machine-learning tool is trained at operation 514. The machine-learning tool appraises the value of the features 502 as they correlate to the training data 512. The result of the training is a trained machine-learning program 516.

When the machine-learning program 516 is used to perform an assessment, new data 518 is provided as an input to the trained machine-learning program 516, and the machine-learning program 516 generates the assessment 520 as output. For example, when copy is checked for a copy driver, the machine-learning program 516 utilizes subject title content and learned data to make that determination.

Figure 6:
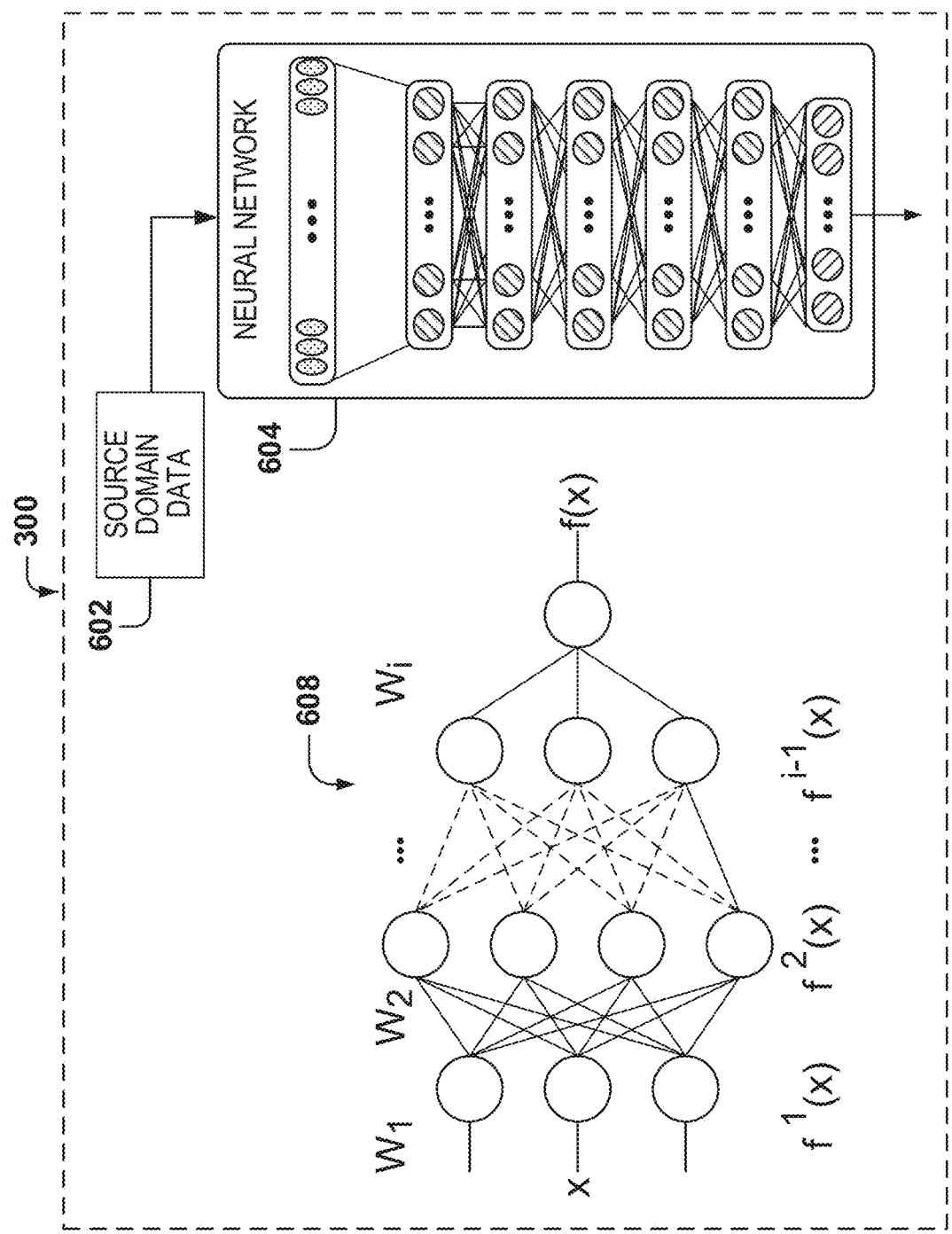
FIG. 6 illustrates machine-learning techniques within a smart copy optimization tool, according to some example embodiments.

With reference to FIG. 6, machine-learning techniques with the smart copy optimization tool 300 train models to accurately identify or make predictions on data 602 fed into the models (e.g., what was said by a user in a given utterance; what words were used in certain copy content, for example an email subject title; whether a noun is a person, place, or thing; what the weather will be like tomorrow). Other data is possible. During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine-learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine-learning algorithms that may be applied with the present disclosure, including linear regression, random forests, decision-tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or according to a fixed time or computing budget, or the learning phase may be terminated before that number, time, or budget is reached when the accuracy of a given model is high enough or low enough or an accuracy plateau has been reached. For example, if the learning phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number or computing budget is reached.

Once the learning phase is complete, the models are finalized. In some example embodiments, models that are finalized are evaluated against testing criteria. In a first example, a testing dataset that includes known outputs for its inputs is fed into the finalized model to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

In some example embodiments, a student model 608 includes, or is trained by, a neural network (e.g., deep learning, deep convolutional, or recurrent neural network), which comprises a series of "neurons," such as Long Short-Term Memory (LSTM) nodes, arranged into a network. A neuron is an architectural element used in data processing and artificial intelligence, particularly machine learning, that includes memory that may determine when to "remember" and when to "forget" values held in that memory based on the weights of inputs provided to the given neuron. Each of the neurons used herein is configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

A neural network, sometimes referred to as an "artificial neural network," is a computing system based on consideration of biological neural networks of animal brains. Such systems progressively improve performance, which is referred to as "learning," to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called "neurons," where each connection, called a "synapse," between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that filter results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks used in an optimization method such as a stochastic gradient descent (SGD) method.

Use of backpropagation can include propagation and weight updating. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 7:
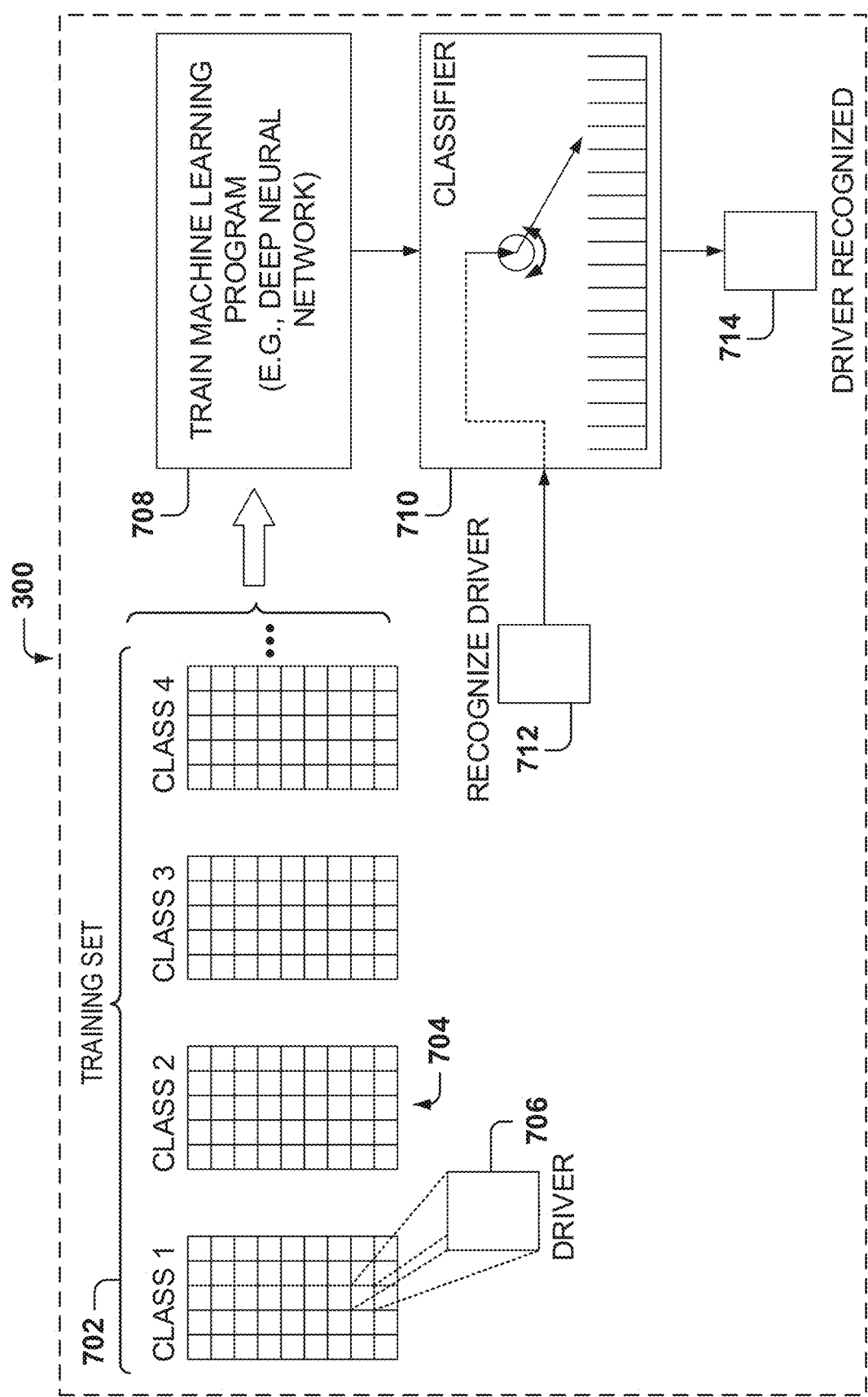
FIG. 7 illustrates the training of a classifier within the smart copy optimization tool, according to some example embodiments.

FIG. 7 illustrates the training of a classifier within the smart copy optimization tool 300, according to some example embodiments. A machine-learning algorithm is designed for recognizing copy drivers, and a training set 702 includes data that maps a sample to a class 704 (e.g., a class includes all the drivers boosting certain actions, e.g., mail openings). The classes may also be referred to as "labels." Although embodiments presented herein are presented with reference to driver recognition, the same principles may be applied to train machine-learning programs used for recognizing any type of items.

The training set 702 includes a plurality of positive or negative drivers for each class (e.g., a positive or negative driver 706), and each driver is associated with one of the categories to be recognized (e.g., a class). An example plurality of positive and negative drivers is discussed further below. The machine-learning program is trained at 708 with the training data to generate a classifier 710 operable to recognize drivers (in other words, a driver recognizer). In some example embodiments, the machine-learning program is a DNN. When an input driver 712 is to be recognized, the classifier 710 analyzes the input driver 712 to identify a class 714 corresponding to the input driver 712.

Figure 8:
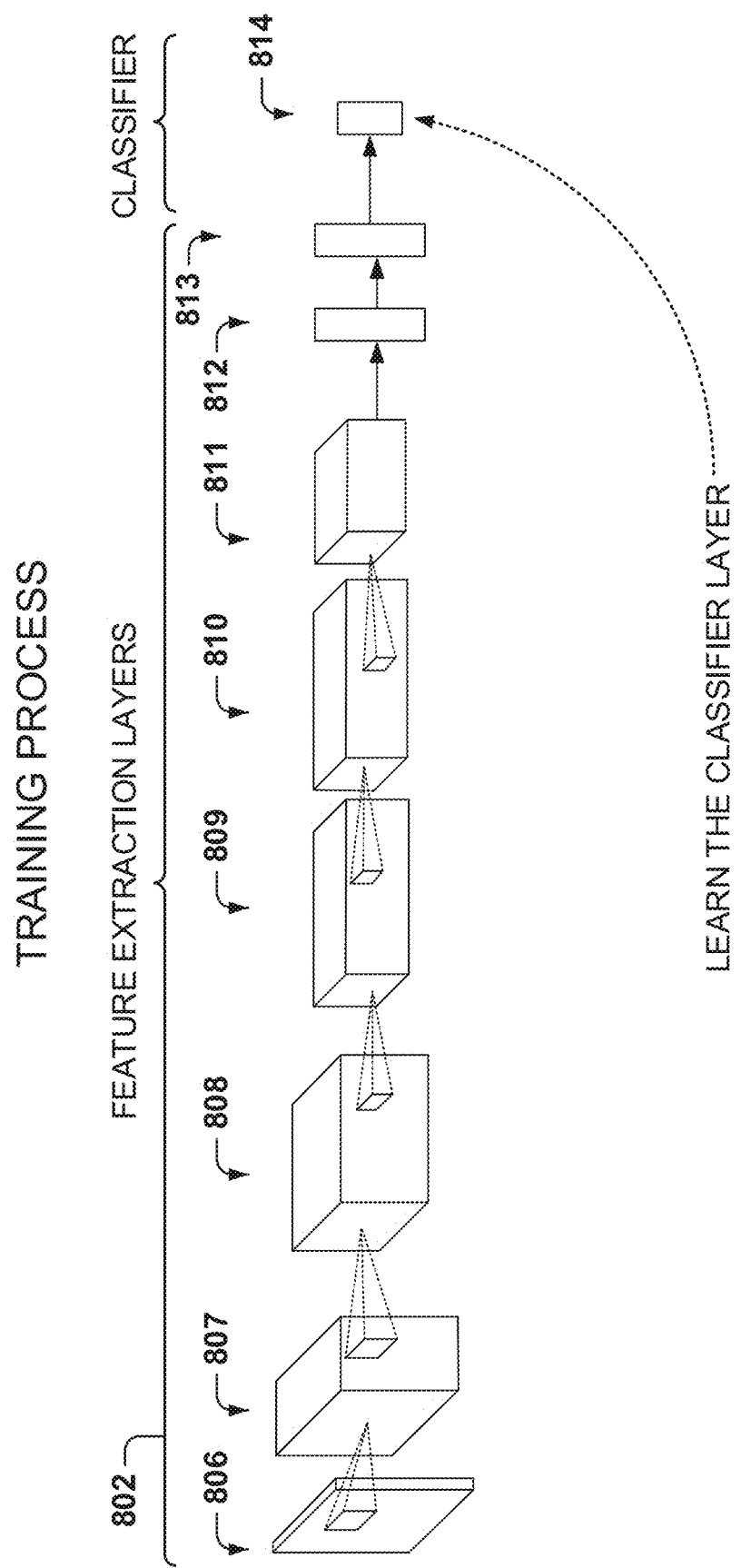
FIG. 8 illustrates a feature-extraction process and classifier training, according to some example embodiments.

FIG. 8 illustrates the feature-extraction process and classifier training, according to some example embodiments. Training the classifier may be divided into feature-extraction layers 802 and a classifier layer 814. Each driver is analyzed in sequence by a plurality of layers 806-813 in the feature-extraction layers 802. In FIG. 8, the data travels from left to right and the drivers are extracted.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set. A neural network may include a plurality of input nodes, wherein each input node includes a memory location for storing an input value; a plurality of hidden nodes, wherein each hidden node is connected to each input node and includes computational instructions, implemented in machine code of the processor, for computing output numbers, respectively; and a plurality of output nodes, wherein each of the output nodes includes a memory location for storing a respective output signal indicative of a first value or feature.

Example positive drivers identified by the smart copy optimization tool 300 in a marketing campaign may include words or phrases such as "save," "free," "sale," "complimentary," "enjoy," and "join." Example negative drivers may include the word "spa." Example positive drivers identified by the smart copy optimization tool 300 in an operational campaign may include words or phrases such as "private-pass," "pre-arrival," and "invitation." Example negative drivers may include the words or phrases "last-minute" or "alert." The ability of the smart copy optimization tool 300 to identify drivers in near-real time allows material inferences to be drawn very quickly.

For example, specific and precisely identified savings and incentive words output by the smart copy optimization tool 300 such as "save," "sale," "free," and "complimentary" are quickly seen to positively impact marketing campaign results. Although this finding may perhaps intuitively fall in line with generally accepted copy practices, it is not an intuitive finding as applied to a luxury hotel, for example. The present technology can therefore remove error induced by a subjective human marketer and greatly assist a human marketer in trying to find marketing drivers in previously un-processable levels of marketing data, for example.

The smart copy optimization tool 300 can identify other example drivers (e.g., specific words that create a sense of urgency) such as "private-pass" or "invitation" that positively impact operational campaign results. On the other hand, specific words such as "last-minute" can (counter-intuitively) be quickly identified as negative drivers in some examples. The output of the smart copy optimization tool 300 allows quick, real-time changes in the deployment of marketing resources and drivers to be made. A technical problem is thus met with a technical solution.

Figure 9:
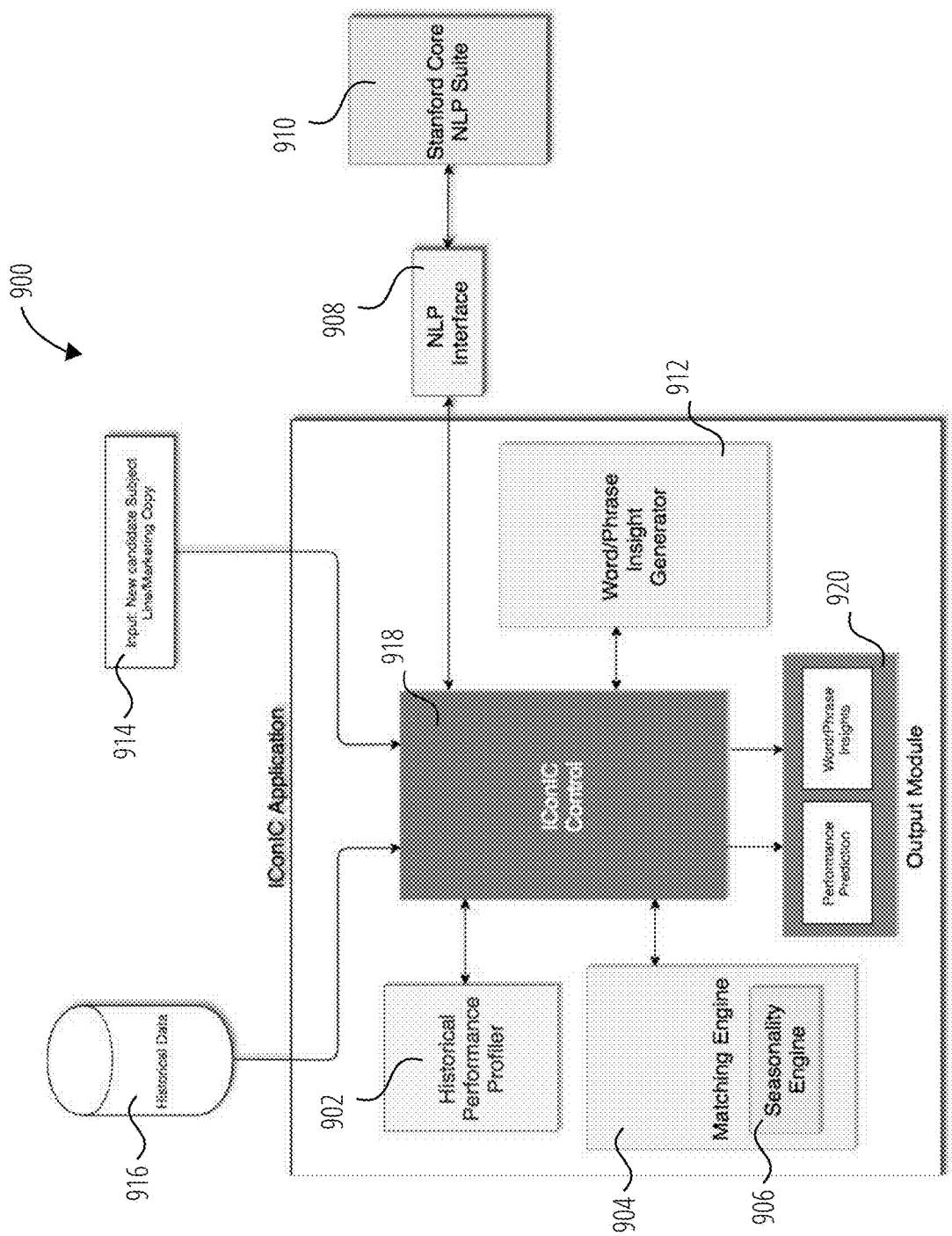
FIG. 9 illustrates aspects of a smart copy optimization tool, according to an example embodiment.

Reference is now made to FIG. 9 which illustrates aspects of a further example of a smart copy optimization tool 900. The tool 900 receives input of new candidate subject line or copy at 914. A control module 918 contains one or more processors configured by instructions to perform certain operations in conjunction with tool components discussed below.

The tool 900 includes an historical performance profiler 902 which extracts from a historical database 916 a text input from a candidate subject line or any comparable marketing language (including social and programmatic creative content) also known as copy. The historical performance profiler 902 accesses historical subject lines or comparable marketing language. In some examples, the historical performance profiler 902 profiles historical performance of comparable subject lines or copy in the context of customer acquisition or CRM marketing, based on the certain metrics. Example metrics may include variance in their historical performance, frequency of usage in the recent past, and recency of their past usage.

The tool 900 further comprises a matching engine 904 to match the text input from the candidate subject line or copy with the historical subject lines or marketing language using an ensemble of heuristic based matching algorithms. The matching engine 904 filters the best historical subject lines or copy that matches the text input of the candidate subject line or marketing language based on certain rules. Example rules may include a quality of match. Here, a higher quality may help to match historical subject lines or copy that are more alike the candidate subject lines and copy. Example rules may include a volume of historical subject lines or copy, weighting more in some examples towards historical subject lines with higher volume helps remove outlier bias. Example rules may include a word count, assigning a higher weight in some examples to historical subject lines or copy that has a word count that closely matches the word count of the candidate subject line or copy. Example rules may include a recency or frequency, wherein a lower weight is assigned to historical subject lines or copy that have a lower frequency of usage or have not been used within a recent time period.

The tool 900 further includes a seasonality engine 906 provided within the matching engine 904 to apply a weighting factor based on past seasonality of historical matches. This aspect may be important because the same subject line or copy may perform significantly differently when deployed during a holiday season as compared to deployment during a non-holiday season. In some examples, the seasonality engine 906 estimates a point-estimate performance of the candidate subject line or copy based on a weighted average of factors identified above. In some examples, the seasonality engine 906 estimates a confidence range of the performance of the candidate subject line or copy based on one weight-adjusted standard deviation interval of the historical matches.

The tool 900 also includes a Natural Language Processing (NLP) interface 908. The NLP interface 908 acts as a communication platform with open source NLP application suites 910 such as Stanford CoreNLP, NLTK, and others. In some examples, the NLP interface 908 facilitates the deployment of machine-learned models (for example, machine-learned models discussed above) by open source software to identify grammar constructs such as word types (nouns, verbs, and adjectives, for example) and types of phrases like noun phrases, and verb phrases, for example. Such phrases may be very helpful to identify important call-to-action language, for example "Act today" or "Holiday Upgrade deals" that drive the performance of the subject line or copy.

Once the relevant words and phrases have been classified based on grammatical entities like nouns, verbs, adjectives, and so forth, a Word/Phrase Insight Generator 912 of the tool 900 creates two mutually exclusive sets of words and phrases that have a high-likelihood of impacting marketing performance. The Insight Generator 912 creates two mutually exclusive subsets of the historical subject line and copy dataset that represent the top and bottom performers. In some examples, cut-off thresholds for these subsets is dynamic to ensure a statistically significant sample for both subsets.

In some examples, the tool 900 uses information retrieval methods such as bag of words, or TF-IDF (Term Frequency-Inverse Document Frequency) to identify potential positive drivers as words or phrases that have a high likelihood of belonging to top performing historical subject lines or copy, or identify potential negative drivers as words or phrases that have a high likelihood of belonging to the bottom performing historical subject lines or copy, or adjust or normalize for occurrence of words or phrases in both top and bottom performing historical subsets, or ensure that the potential positive drivers are mutually exclusive to potential negative drivers.

In some examples, an output module 920 helps to identify additional insights that add additional context for a specific advertiser. Once the output module 920 has received a performance prediction (for example, a predicted performance and/or a predicted range) and positive and negative drivers from the word or phrase insights, the output process may be repeated at three levels of hierarchy.

For example, in a first advertiser level, predictions and insights may be provided for a specific client. In a second industry/vertical level, predictions and insights may be provided for all clients in the same business or industry. This may help to provide more context (wherever applicable, subject to legal disclosure agreements) to an advertiser as what additional marketing language may be relevant to improve marketing performance with respect to subject lines or copy. In a third universal level, predictions and insights may be provided for all clients across all industries.

Although the subject matter herein has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A copy optimization tool comprising:
a memory;
a neural network including:
a plurality of input nodes, wherein each input node includes a memory location for storing an input value;
a plurality of hidden nodes, wherein each hidden node is connected to each input node and includes computational instructions, implemented in machine code, for computing output values, respectively; and
a plurality of output nodes, wherein each of the output nodes includes a memory location for storing a respective output signal indicative of an output value or feature for a trained model;
one or more computer processors, configured to execute instructions programmed using a set of machine code, wherein the instructions, when executed by the one or more computer processors, cause the one or more computer processors to perform operations comprising:
extracting a text input from a candidate copy content;
using the trained model, accessing comparable historical copy content to generate historical comparison content;
profiling a historical performance of the historical comparison content in a context of CRM marketing, based on one or more of the following metrics:
a variance in the historical performance of the comparison content;
a frequency of use of a historical subject line or comparable copy content; and
a recency of use of a historical subject line or comparable copy content;
matching the text input from the candidate copy content with the comparable copy content based on one or more matching algorithms;
identifying historical matches of comparable copy content matching the text input of the candidate copy content;
ranking the historical matches based on one or more of the following rules:
a quality of a match;
a volume of historical subject lines or comparable copy content;
a word count; and
a recency or frequency of a historical subject line or comparable copy content; and
applying a weighting factor to the historical matches based on a past seasonality of historical matches.

2. The copy optimization tool of claim 1, wherein the operations further comprise:
identifying a plurality of drivers in the extracted text using the trained model based on the profiled historical performance.

3. The copy optimization tool of claim 2, wherein the plurality of drivers include positive and negative drivers.

4. The copy optimization tool of claim 3, wherein the operations further comprise changing at least one of the negative drivers to a positive driver and transmitting a modified candidate copy content having the changed driver.

5. A method for copy optimization, comprising:
extracting, with a processor, a text input from a candidate copy content;
using a trained model of a neural network, accessing, with the processor, comparable historical copy content to generate historical comparison content; the neural network including
a plurality of input nodes, wherein each input node includes a memory location for storing an input value;
a plurality of hidden nodes, wherein each hidden node is connected to each input node and includes computational instructions, implemented in machine code, for computing output values, respectively; and
a plurality of output nodes, wherein each of the output nodes includes a memory location for storing a respective output signal indicative of an output value or feature for a trained model;
profiling, with the processor, a historical performance of the historical comparison content in a context of CRM marketing, based on one or more of the following metrics:
a variance in the historical performance of the comparison content;
a frequency of use of a historical subject line or comparable copy content; and
a recency of use of a historical subject line or comparable copy content;
matching, with the processor the text input from the candidate copy content with the comparable copy content based on one or more matching algorithms;
identifying, with the processor, historical matches of comparable copy content matching the text input of the candidate copy content; and
ranking, with the processor, the historical matches based on one or more of the following rules:
a quality of a match;
a volume of historical subject lines or comparable copy content;
a word count; and
a recency or frequency of a historical subject line or comparable copy content; and
applying, with the processor, a weighting factor to the historical matches based on a past seasonality of historical matches.

6. The method of claim 5, further comprising:
identifying, with the processor, a plurality of drivers in the extracted text using the trained model based on the profiled historical performance.

7. The method of claim 6, wherein the plurality of drivers include positive and negative drivers.

8. The method of claim 7, further comprising changing, with the processor, at least one of the negative drivers to a positive driver and transmitting a modified candidate copy content having the changed driver.

9. A non-transitory computer-readable medium storing instructions that, when executed by one or more computer processors of a computer, cause the computer to perform operations comprising:
   extracting a text input from a candidate copy content;
   using a trained model of a neural network, accessing comparable historical copy content generate historical comparison content; the neural network including
   a plurality of input nodes, wherein each input node includes a memory location for storing an input value;
   a plurality of hidden nodes, wherein each hidden node is connected to each input node and includes computational instructions, implemented in machine code, for computing output values, respectively; and
   a plurality of output nodes, wherein each of the output nodes includes a memory location for storing a respective output signal indicative of an output value or feature for a trained model;
   profiling a historical performance of the historical comparison content in a context of CRM marketing, based on one or more of the following metrics:
      a variance in the historical performance of the comparison content;
      a frequency of use of a historical subject line or comparable copy content; and
      a recency of use of a historical subject line or comparable copy content;
   matching the text input from the candidate copy content with the comparable copy content based on one or more matching algorithms;
   identifying historical matches of comparable copy content matching the text input of the candidate copy content; and
   ranking the historical matches based on one or more of the following rules:
      a quality of a match;
      a volume of historical subject lines or comparable copy content;
      a word count; and
      a recency or frequency of a historical subject line or comparable copy content; and
   applying a weighting factor to the historical matches based on a past seasonality of historical matches.

10. The computer-readable medium of claim 9, wherein the operations further comprise:
   identifying a plurality of drivers in the extracted text using the trained model based on the profiled historical performance.

11. The computer-readable medium of claim 10, wherein the plurality of drivers include positive and negative drivers.

12. The computer-readable medium of claim 11, wherein the operations further comprise changing at least one of the negative drivers to a positive driver and transmitting a modified candidate copy content having the changed driver.

* * * * *

UNITED STATES PATENT AND TRADEMARK OFFICE
CERTIFICATE OF CORRECTION

| | |
|---|---|
| PATENT NO. | : 11,295,237 B2 |
| APPLICATION NO. | : 16/220518 |
| DATED | : April 5, 2022 |
| INVENTOR(S) | : Korada et al. |

It is certified that error appears in the above-identified patent and that said Letters Patent is hereby corrected as shown below:

In the Drawings

On sheet 4 of 9, Fig. 4, reference numeral 428, Line 3, delete "PONT BASED" and insert --POINT BASED-- therefor In the Specification In Column 11, Line 60, delete "RS S-2D" and insert --RSS-2D-- therefor In the Claims In Column 20, Line 45, in Claim 5, after "processor", insert --,--

In Column 21, Line 11, in Claim 9, after "content", insert --to--

Signed and Sealed this
First Day of November, 2022

Katherine Kelly Vidal
*Director of the United States Patent and Trademark Office*